United States Patent
Djelassi et al.

(10) Patent No.: US 10,027,110 B2
(45) Date of Patent: Jul. 17, 2018

(54) COMMUNICATING WITH POWER SWITCHING DEVICES

(71) Applicant: Infineon Technologies AG, Neubiberg (DE)

(72) Inventors: Christian Djelassi, Villach (AT); Hans-Peter Kreuter, Villach (AT); Robert Illing, Villach (AT)

(73) Assignee: Infineon Technologies AG, Neubiberg (DE)

( * ) Notice: Subject to any disclaimer, the term of this patent is extended or adjusted under 35 U.S.C. 154(b) by 724 days.

(21) Appl. No.: 14/610,386

(22) Filed: Jan. 30, 2015

(65) Prior Publication Data
US 2016/0226236 A1 Aug. 4, 2016

(51) Int. Cl.
H02H 7/26 (2006.01)
H02J 7/00 (2006.01)

(52) U.S. Cl.
CPC ........... *H02H 7/261* (2013.01); *H02J 7/0032* (2013.01)

(58) Field of Classification Search
CPC ........................................................ H02H 3/08
See application file for complete search history.

(56) References Cited

U.S. PATENT DOCUMENTS

| 8,094,468 B2 | 1/2012 | Yang et al. |
| 8,212,493 B2 | 7/2012 | Melanson et al. |
| 8,638,076 B2 | 1/2014 | Young |
| 2009/0259865 A1* | 10/2009 | Sheynblat ............. G06F 1/3203 713/323 |
| 2013/0232349 A1* | 9/2013 | Oler ........................ G06F 1/263 713/300 |

FOREIGN PATENT DOCUMENTS

| CN | 101488714 A | 7/2009 |
| CN | 101753034 A | 6/2010 |
| CN | 101938219 A | 1/2011 |
| CN | 101978748 A | 2/2011 |

OTHER PUBLICATIONS

"Power Distribution for Start-Stop Systems with Dual Battery Approach," Infineon Technologies AG, retrieved from http://www.infineon.com/cms/en/applications/automotive/body-convenience/pdm/ on Jan. 29, 2015, 4 pp.

(Continued)

*Primary Examiner* — Jeffrey Shin
(74) *Attorney, Agent, or Firm* — Shumaker & Sieffert, P.A.

(57) ABSTRACT

In one example, a method includes receiving, by a power switching device and via a connector of the power switching device, a signal that causes the power switching device to transition from a first operating mode to a second operating mode in which the power switching device consumes less current than the first operating mode. In this example, the method also includes, responsive to determining, while the power switching device is in the second operating mode, an occurrence of one or more events, outputting, by the power switching device and via the same connector of the power switching device, a signal that indicates the occurrence of the one or more events.

20 Claims, 4 Drawing Sheets

(56) References Cited

OTHER PUBLICATIONS

"LM26003-xx 3-A Switching Regulator With High Efficiency Sleep Mode," Texas Instruments, Product Data Sheet LM26003, LM26003-Q1, Aug. 2008, 32 pp.

"Smart High-side Switch Module (Triple 6.0 mOhm and Dual 17 mOhm)," Freescale Semiconductor, Inc., Technical Data Sheet, Document No. MC06XS3517, Rev. 5.0, Apr. 2014, 41 pp.

"Power management in on-board electrical systems of agricultural and construction machinery," E-T-A Elektrotechnische Apparate GmbH, retrieved from http://radel.co.za/website/attachments/073_Power%20Management%20-%20Construction%20&%20Agriculture.pdf on Jan. 29, 2015, 12 pp.

"ATOF Blade Fuse Rated 32V," Littelfuse, retrieved from http://www.littelfuse.com/~/media/automotive/datasheets/fuses/passenger-car-and-commercial-vehicle/blade-fuses/littelfuse_atof_datasheet.pdf on Jan. 29, 2015, 2 pp.

Office Action, in Chinese, from counterpart Chinese Patent Application No. 201610062124.1, dated Jan. 17, 2018, 8 pp.

\* cited by examiner

COMMUNICATING WITH POWER SWITCHING DEVICES

TECHNICAL FIELD

This disclosure relates to communicating with power switching devices, and in particular, to using a single connector of a power switching device to both receive and output signals.

BACKGROUND

Power switching devices may be used to control the amount of power provided to loads. A power switching device may include a power transistor, which may be configured to control the amount of power provided to an external load, and an internal controller that enables built-in fault protection. In addition, a power switching device may include a plurality of connectors (i.e., pins) that are used to transport signals from the power switch device to one or more external devices. For instance, a power switching device may have an input pin configured to receive an activation signal, and an output pin configured to output a power signal to a load.

In some systems, such as battery powered systems, some power switching devices may always receive power while other power switching devices may only receive power under certain conditions. For instance, in a vehicle, some power switching devices may always receive power, referred to as KL30 supply, while other power switching devices may only receive power when the engine on, referred to as KL15 supply.

In some examples, such as for power switching devices that always receive power (i.e., KL30), it may be desirable to reduce the amount of power consumed, e.g., when the engine is off. For instance, high power consumption by power switching devices may reduce the life-span of the battery, and may also reduce the amount of power available from the battery, which may prohibit the vehicle from starting. As such, some power switching devices may be configured to operate in a plurality of power modes, at least one of which is a low-current consumption mode (LCCM) also referred to as a low-power operating mode.

In some examples, an external controller may be used to control the operation of one or more power switching devices. As one example, a controller may be configured to output an activation signal to an input connector of a power switching device to cause the power switching device to output a power signal to a load via its output connector. As another, a controller may output an operating mode control signal to a mode select connector of a power switching device to cause the power switching device to transition between operating modes.

In some examples, it may be desirable for a controller to communicate additional information with a power switching device. For instance, as opposed to only receiving an activation signal, it may be desirable for a power switching device to exchange additional information with the controller.

SUMMARY

In general, this disclosure is directed to power switching devices that receive operating mode control signals and output signals that indicate an occurrence of one or more events. For example, a power switching device may include a single connector via which power mode signals are received and signals that indicate an occurrence of one or more events are output. Some example events include, but are not limited to, periodic one or more wake-up events and/or one or more fault conditions.

In one example, a method includes, receiving, by a power switching device and via a connector of the power switching device, a signal that causes the power switching device to transition from a first operating mode to a second operating mode in which the power switching device consumes less current than the first operating mode. In this example, the method also includes, responsive to determining, while the power switching device is in the second operating mode, an occurrence of one or more events, outputting, by the power switching device and via the same connector of the power switching device, a signal that indicates the occurrence of the one or more events.

In another example, a system includes a controller, and a power switching device. In this example, the controller is configured to output a signal to a connector of the power switching device that causes the power switching device to transition from a first operating mode to a second operating mode in which the power switching device consumes less power than in the first operating mode. Also in this example, after outputting the signal to the connector of the power switching device that causes the power switching device to transition from the normal operating mode to the low-current operating mode, the controller is configured to transition from a first operating mode to a second operating mode in which the controller consumes less power than in the first operating mode. Also in this example, while in the second operating mode, in response to determining an occurrence of one or more events, the power switching device is configured to output, via the same connector of the power switching device, a signal that indicates the occurrence of the one or more events. Also in this example, the controller is configured to transition from the second operating mode to the first operating mode in response to receiving, from the power switching device, the signal that indicates the occurrence of the one or more events.

In another example, a power switching device includes a connector configured to receive a signal that causes the power switching device to transition from a first operating mode to a second operating mode in which the power switching device consumes less current than the first operating mode. In this example, the power switching device also includes one or more processors configured to output, via the same connector of the power switching device and in response to determining an occurrence of one or more events while the power switching device is in the second operating mode, a signal that indicates the occurrence of the one or more events.

In another example, a power switching device includes means for receiving a signal that causes the power switching device to transition from a first operating mode to a second operating mode in which the power switching device consumes less current than the first operating mode, and means for determining, an occurrence of one or more events. In this example, the means for receiving are further configured to output, while the power switching device is in the second operating mode, a signal that indicates an occurrence of one or more events.

The details of one or more examples of the disclosure are set forth in the accompanying drawings and the description below. Other features, objects, and advantages will be apparent from the description and drawings, and from the claims.

DETAILED DESCRIPTION

In general, this disclosure is directed to power switching devices that receive operating mode control signals and output signals that indicate an occurrence of one or more fault conditions. In some examples, a power switching device may communicate with an external device using one or more signal specific connectors. For instance, a power switching device may receive power mode control signals via an operating mode input connector, and output signals that indicate an occurrence of one or more events via a different status connector. However, in some examples, it may be desirable to reduce the number of connectors included on a power switching device.

In accordance with one or more techniques of this disclosure, a power switching device may include a single connector via which operating mode signals are received and signals that indicate an occurrence of one or more events are output. For instance, a controller may output, to a connector of a power switching device, a signal that causes the power switching device to transition from a first operating mode to a second operating mode in which the power switching device consumes less current than the first operating mode. In some examples, after outputting the signal to the power switching device, the controller may transition from a first operating mode to a second operating mode in which the controller switching device consumes less current than the first operating mode.

While in the second operating mode, the power switching device may determine whether one or more events have occurred. In response to determining that one or more events have occurred, the power switching device may output, to the controller, a signal that indicates the occurrence of the one or more events via the connector (i.e., the same connector via which the signal that caused the power switching device to transition from the first operating mode to the second operating mode was received). In some examples, in response to receiving the signal that indicates the occurrence of the one or more events, the controller may transition from the second operating mode to the first operating mode and may perform one or more operations to respond to the occurrence of the one of more events. In this way, the number of connectors included on a power switching device may be reduced without reducing the number of signals sent and received.

Figure 1:
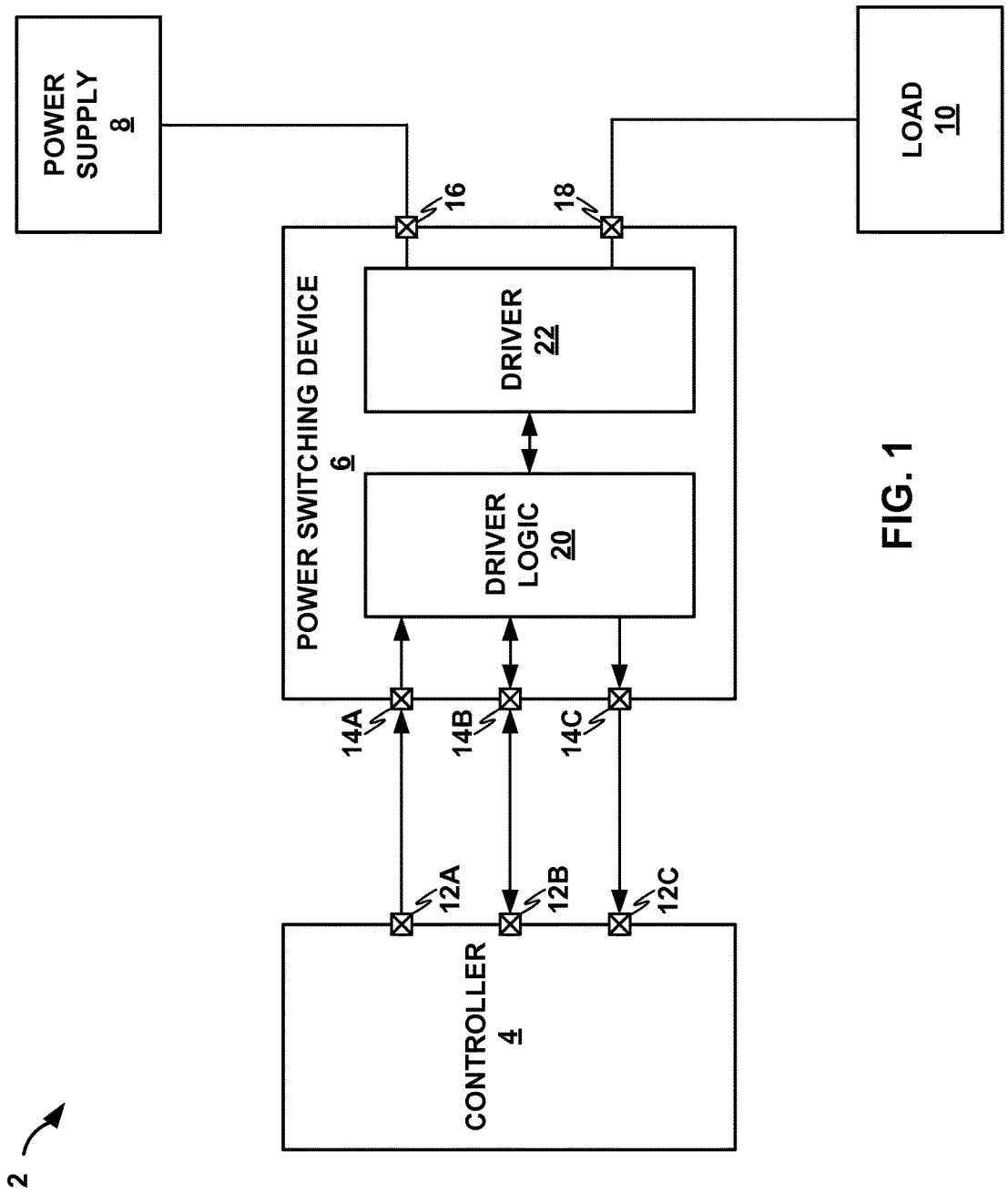
FIG. 1 is a conceptual diagram illustrating an example system that includes a power switching device that includes a single connector via which operating mode signals are received and signals that indicate an occurrence of one or more events are output, in accordance with one or more exemplary techniques of this disclosure.

FIG. 1 is a conceptual diagram illustrating an example system that includes a power switching device that includes a single connector via which operating mode signals are received and signals that indicate an occurrence of one or more events are output, in accordance with one or more exemplary techniques of this disclosure. As illustrated in FIG. 1, system 2 includes controller 4, power switching device 6, power supply 8, and load 10.

In some examples, system 2 may include controller 4, which may be configured to communicate with power switching device 6. As one example, controller 4 may output an activation signal to power switching device 6 to cause power switching device 6 to output a power signal to load 10. In some examples, the activation signal may be a logical signal (e.g., an active high signal where logic high causes power switching device 6 to output the power signal, or an active low signal where logic low causes power switching device 6 to output the power signal). As another example, controller 4 may receive, from power switching device 6, a feedback signal that represents the power signal. In some examples, the feedback signal may represent a current level of the power signal. Examples of controller 4 may include, but are not limited to, one or more processors, including, one or more microprocessors, digital signal processors (DSPs), application specific integrated circuits (ASICs), field programmable gate arrays (FPGAs), or any other equivalent integrated or discrete logic circuitry, as well as any combinations of such components.

In some examples, controller 4 may be configured to operate in a plurality of operating modes. For instance, controller 4 may operate in a full-power operating mode, a low-power operating mode (e.g., a sleep mode), and/or one or more intermediate power operating modes. When operating in the low-power operating mode, controller 4 may consume less power than when operating in the full-power operating mode. In some examples, controller 4 may switch between operating modes based on signals received from one or more external devices. As one example, controller 4 may switch from the low-power operating mode to a higher power mode, such as the full-power operating mode, in response to receiving a signal from power switching device 6 that indicates the occurrence of the one or more events. As another example, where system 2 is integrated into a vehicle, controller 4 may switch from the full-power operating mode to a lower power mode, such as the low-power operating mode, in response to receiving a signal indicating that the vehicle has been shut down (e.g., if the vehicle includes an engine, that the engine has been turned off).

As illustrated in FIG. 1, controller 4 may include connectors 12A-12C (collectively, "connectors 12") which may be connected to power switching device 6 via respective traces, wires, or any other suitable interconnection. While illustrated in the example of FIG. 1 as having three connectors (i.e., connector 12A, connector 12B, and connector 12C), in some examples, connectors 12 may include any number of connectors. For instance, connectors 12 may include two connectors, four connectors, etc.

In some examples, system 2 may include power supply 8, which may be configured to output power to one or more components of system 2. Examples of power supply 8 may include, but are not limited to, batteries, power converters (e.g., DC/DC converters, AC/DC converters, AC/AC converters, and/or DC/AC converters). For instance, in automotive applications, power supply 8 may include a car battery configured to provide approximately 10V-18V and the needed current to power the one or more components of system 2.

In some examples, system 2 may include load 10 which may be configured to receive power from power switching device 6. In some examples, load 10 may include one or more light emitting devices (e.g., one or more light bulbs, one or more light emitting diodes (LEDs), one or more laser diodes, and the like), one or more batteries, one or more computing devices, one or more resistive devices, one or more capacitive devices, one or more inductive devices, any other device that uses electrical power, or any combination of the same. As illustrated in FIG. 1, load 10 may be connected to power output connector 18 of power switching device 6 such that power switching device 6 may be a high-side driver with respect to load 10.

As illustrated in FIG. 1, system 2 includes power switching device 6, which may be configured to control the amount of current flowing through load 10. In some examples, power switching device 6 includes connectors 14A-14C (collectively, "connectors 14"), power input connector 16, power output connector 18, communication module 20, driver logic 22, and driver 24. Examples of power switching device 6 include, but are not limited to, integrated circuits, and discrete components.

In some examples, power switching device 6 may include connectors 14 which may be configured to receive and/or output communication signals between power switching device 6 and one or more external devices, such as controller 4. As illustrated in FIG. 1, connector 14 may be connected to controller 4 via respective traces, wires, or any other suitable interconnection. While illustrated in the example of FIG. 1 as having three connectors (i.e., connector 14A, connector 14B, and connector 14C), in some examples, connectors 14 may include any number of connectors. For instance, connectors 14 may include two connectors, four connectors, etc.

In some examples, power switching device 6 may include power input connector 16 and power output connector 18, which may be configured to receive and/or output power signals. For instance, power input connector 16 may be configured to receive a power signal from power supply 8 and power output connector 18 may be configured to output a power signal to load 10.

In some examples, power switching device 6 may include input connector 16, and output connector 18. In some examples, one or more of connector 14, power input connector 16, and power output connector 18 may be high voltage interface connectors. In this way, one or more of connector 14, power input connector 16, and power output connector 18 may comply with one or more safety requirements, such as ISO26262 and/or IEC61508.

In some examples, power switching device 6 may include driver logic 20, which may be configured to output a signal to control one or more drivers. For instance, driver logic 20 may output a control signal to the gate of driver 22. In some examples, driver logic 20 may output the control signal based on a signal received from one or more other components of system 2, such as a control signal received from controller 4. In some examples, driver logic 20 may perform one or more operations to protect the functionality of driver 22. As one example, driver logic 22 may deactivate driver 22 if the temperature of driver 22 exceeds a temperature threshold. As another example, driver logic 20 may deactivate driver 22 if the current level of the power signal generated by driver 22 exceeds a current threshold.

In some examples, driver logic 20 may be configured to determine an occurrence of one or more events. As one example, driver logic 20 may determine an occurrence of one or more periodic wake-up events. For instance, driver logic 20 may determine that a wake-up event occurs at a particular time interval (e.g., 1 min, 5 min, 30 min, 1 hour, 1 day, etc.). As another example, driver logic 20 may determine an occurrence of one or more fault conditions. For instance, driver logic 20 may determine that a temperature has crossed one or more thresholds (i.e., an over or under-temperature condition), that a level, such as a voltage level or a current level, has crossed one or more thresholds (i.e., an overload or underload condition), that a short-circuit exists, or any other fault condition which may be experienced by a power switching device. In some examples, driver logic 20 may determine the occurrence of one or more fault conditions based on information received from driver 22 (e.g., temperature information, current information, voltage information, etc.).

In some examples, power switching device 6 may include driver 22, which may be configured to provide power to drive a load based on a control signal. For instance, driver 22 may generate a power signal to drive load 10 via power output connector 18 based on a control signal received from driver logic 20. In some examples, driver 22 may include one or more components to provide feedback to driver logic 20. For instance, driver 22 may include a temperature sensor configured to provide an indication of the temperature of driver 22 to driver logic 20, a current sensor configured to provide an indication of the current level of the power signal to driver logic 20, and/or a voltage sensor configured to provide an indication of the voltage level of the power signal to driver logic 20.

In some examples, driver 22 may include one or more power transistors, one or more metal-oxide-semiconductor field-effect transistors (MOSFETs), one or more thyristors, one or more insulated-gate bipolar transistors (IGBTs), and/or a combination of the same. Some example MOSFETs that may be included in driver 22 include, but are not limited to, one or more double-diffused metal-oxide-semiconductor (DMOS) MOSFETs, one or more P-substrate (PMOS) MOSFETs, one or more trench (UMOS) MOSFETS, and one or more super-junction deep-trench MOSFETs (e.g., one or more CoolMOS™ MOSFETs).

In some examples, power switching device 6 may be configured to operate in a plurality of operating modes. For instance, power switching device 6 may operate in a full-power operating mode, a low-power operating mode (e.g., a sleep mode), and/or one or more intermediate power operating modes. When operating in the low-power operating mode, power switching device 6 may consume less power than when operating in the full-power operating mode. In some examples, the low-power operating mode may be referred to as a low current consumption mode. In some examples, power switching device 6 may switch between operating modes based on signals received from one or more external devices. For example, power switching device 6 may switch from a higher power mode, such as the full-power operating mode, to a lower power mode, such as the low-power operating mode, in response to receiving a signal from controller 4. In some examples, power switching device 6 may switch between operating modes based on an occurrence of one or more events. For example, power switching device 6 may switch from a lower power mode, such as the low-power operating mode, to a higher power mode, such as the full-power operating mode, in response to determining that one or more events has occurred/is occurring.

In operation, controller 4 and power switching device 6 may initially be operating in full-power modes. For instance, where system 2 is included in a vehicle, controller 4 may cause power switching device 6 to supply power to a component of the vehicle, such as an anti-theft system. In some examples, controller 4 may cause power switching device 6 to supply power to the component by pulling-up a level of connector 12A. Controller 4 may transition from the full-power operating mode to a lower power mode, such as the low-power operating mode. For instance, controller 4 may transition from the full-power operating mode to a lower power mode, such as the low-power operating mode, in response to receiving a signal indicating that the vehicle has been shut down (e.g., if the vehicle includes a combustion engine, that the engine has been turned off). In some examples, before transitioning into the low-power operating mode, controller 4 may cause power switching device 6 to transition from the full-power operating mode to a lower power mode, such as the low-power operating mode. For instance, controller 4 may output, via connector 12B, a signal that requests that power switching device 6 to transition from the full-power operating mode to the low-power operating mode. As one example, controller 4 may pull-down a level of connector 12B.

In any case, power switching device 6 may receive, via a particular connector such as connector 14B, the signal that requests that power switching device 6 to transition from the full-power operating mode to the low-power operating mode. For instance, driver logic 20 may determine that a level of connector 14B has been pulled-down. Responsive to receiving the signal, power switching device 6 may transition to the low-power operating mode. Driver logic 20 may determine whether one or more events has occurred or is occurring. For example, driver logic 20 may determine whether a temperature of driver 22 has exceeded a maximum temperature threshold.

In response to determining an occurrence of one or more events, driver logic 20 may output a signal that indicates the occurrence of the one or more events. In accordance with one or more techniques of this disclosure, as opposed outputting the signal via a different connector connectors 14 than the connector of connectors 14 used to receive the signal that requested that power switching device 6 to transition from the full-power operating mode to the low-power operating mode, power switching device 6 may use a single connector of connectors 14 to both receive the signal that causes power switching device 6 to transition between operating modes and output the signal that indicates the occurrence of the one or more events. For instance, driver logic 20 may use connector 14B to both receive the signal that causes power switching device 6 to transition between operating modes and output the signal that indicates the occurrence of the one or more events. In some examples, driver logic 20 may output the signal that indicates the occurrence of the one or more events by pulling-up a level of connector 14B for a defined period of time (e.g., 1 ms, 5 ms, 20 ms). In this way, power switching device 6 may achieve the benefits of receiving signals that cause power switching device 6 to transition between operating modes and outputting signals that indicates the occurrence of the one or more events with a single connector.

Responsive to receiving the signal that indicates the occurrence of the one or more events, controller 4 may transition from the low-power operating mode to the full-power operating mode. In some examples, controller 4 may use a single connector, such as connector 12B, to both output the signal that causes power switching device 6 to transition into the low-power operating mode and to receive the signal that indicates the occurrence of the one or more events. In some examples, controller 4 may use different connectors to output the signal that causes power switching device 6 to transition into the low-power operating mode and to receive the signal that indicates the occurrence of the one or more events. For instance, controller 4 may use connector 12A to output the signal that causes power switching device 6 to transition into the low-power operating mode, and use connector 12B to receive the signal that indicates the occurrence of the one or more events. In some examples, such as where controller 4 uses a single connector as described above, controller 4 may configure the connector as an output when operating in the full-power mode and configure the connector as an input when operating in the low-power mode. For instance, when transitioning into the low-power operating mode, controller 4 may configure the connector to receive an interrupt.

Figure 2:
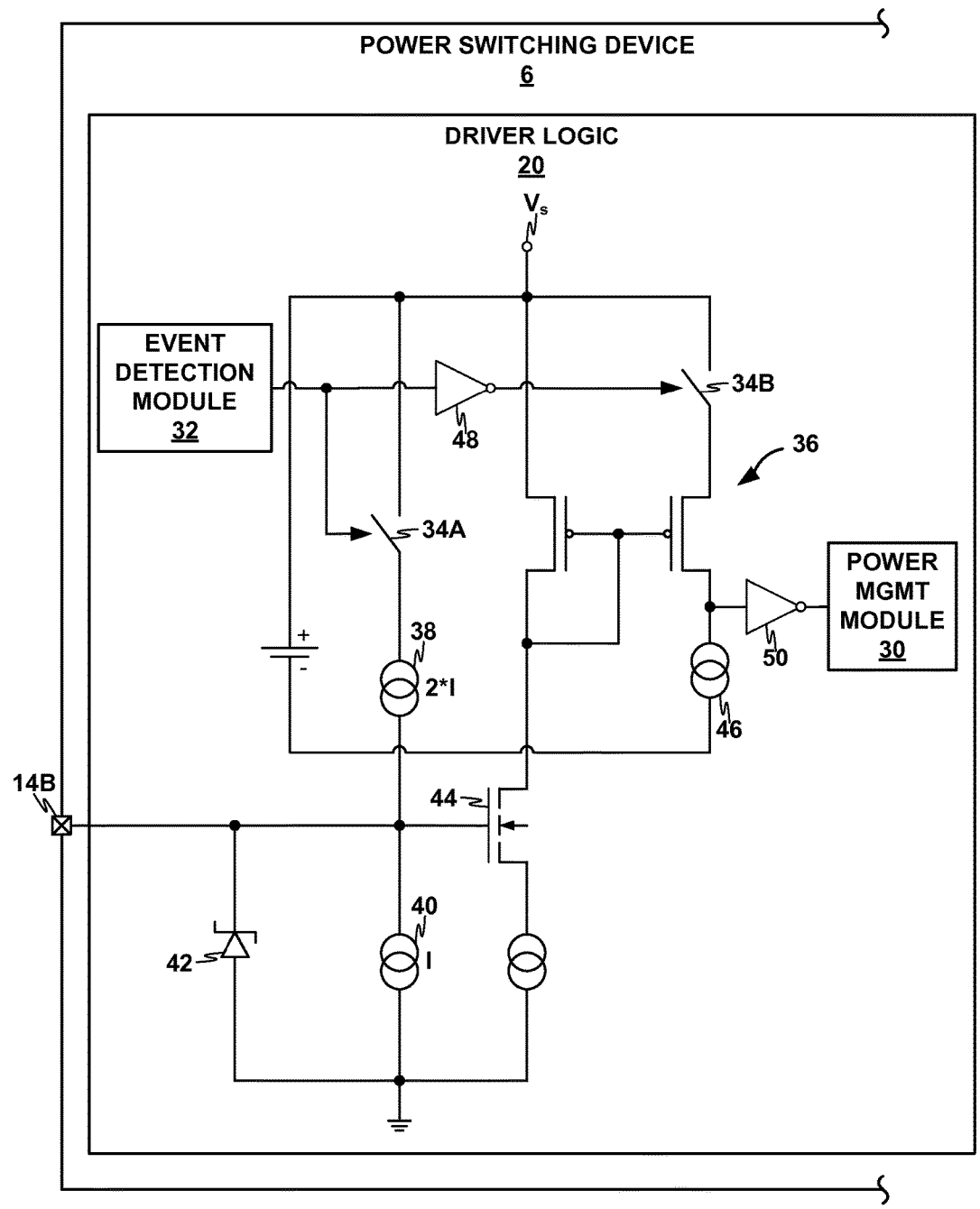
FIG. 2 is a schematic diagram illustrating further details of power switching device 6 of FIG. 1 that is configured to use a single connector to both receive and output signals, in accordance with one or more techniques of this disclosure.

FIG. 2 is a schematic diagram illustrating further details of power switching device 6 of FIG. 1 that is configured to use a single connector to both receive and output signals, in accordance with one or more techniques of this disclosure. As illustrated in FIG. 2, driver logic 20 of power switching device 6 may include power management module 30, event detection module 32, switches 34A and 34B (collectively, "switches 34"), current mirror 36, current 38, current 40, electrostatic discharge protection 42, transistor 44, current 46, inverter 48, and inverter 50.

In some examples, driver logic 20 may include switches 34, which may be configured to selectively conduct current. As illustrated in FIG. 2, switches 34 may be configured to alternatively be open/closed based on a signal output by event detection module 32. For instance, as the output of event detection module 32 is shown as directly controlling switch 34A and controlling switch 34B via inverter 48, switch 34A will be open when switch 34B is closed, and vice versa.

Figure 3:
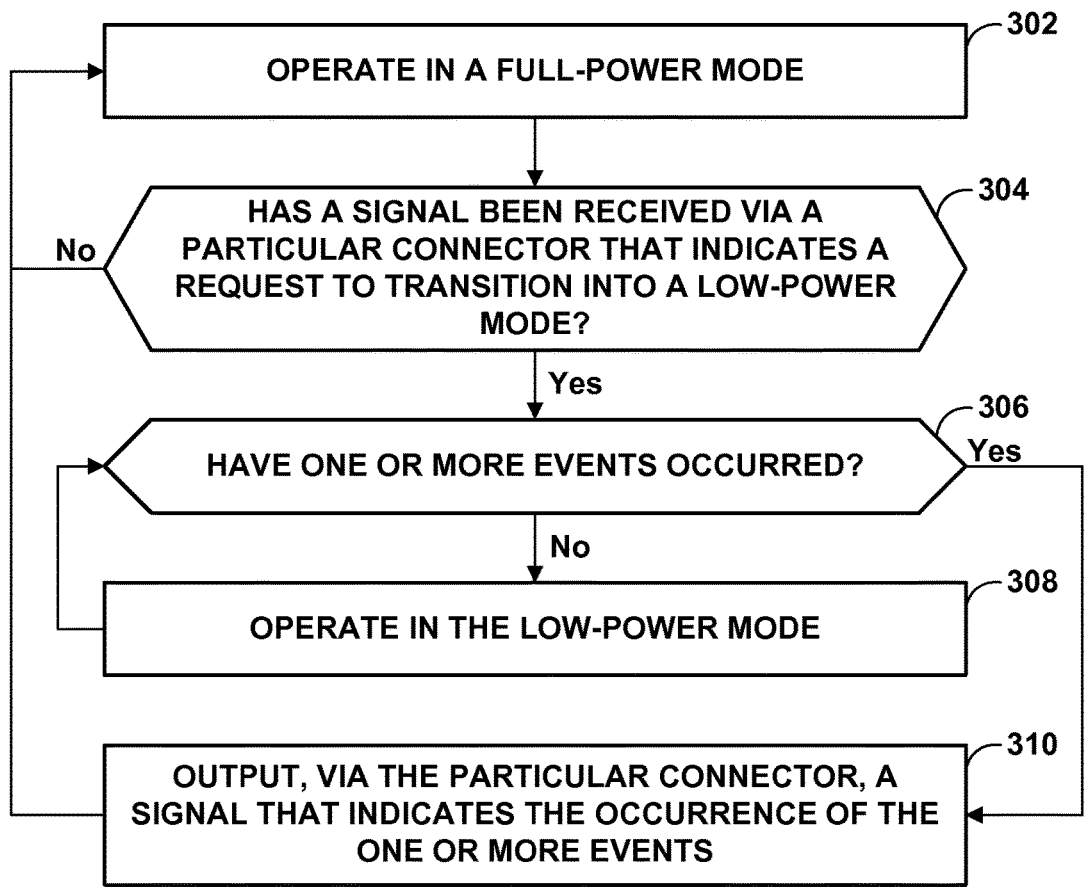
FIG. 3 is a flowchart illustrating exemplary operations of an example power switching device, in accordance with one or more techniques of this disclosure.

In some examples, driver logic 20 may include current 38 and current 40. While illustrated as current sources, in some examples, current 38 and current 40 may be other components, such as resistors. As illustrated in FIG. 3, current 38 may be twice as large as current 40, current 40 may always be pulling-down a current level of connector 14B, and current 38 may pull-up the current level of connector 14B when switch 34A is closed. As such, when switch 34A is closed, the current level of connector 14B may be pulled-up. Similarly, when switch 34A is open, the current level of connector 14B may be pulled-down.

In some examples, driver logic 20 may include transistor 44, which may be configured to generate a current in response to a level of connector 14B being pulled-up. As illustrated in FIG. 3, the current generated by transistor 44 may be mirrored by current mirror 36 when switch 34B is closed. As such, when the level of connector 14B is pulled-up and switch 34B is closed, transistor 44 and current mirror 46 may generate current 46. Inverter 50 may invert the output of current mirror 46 such that, when the level of connector 14B is pulled-up and switch 34B is closed, power management module 30 receives a signal indicating that the level of connector 14B is pulled-up.

In some examples, driver logic 20 may include power management module 30, which may mange the power state of power switching device 6. For instance, power management module 30 may cause power switching device 6 to operate in, and transition between, a plurality of operating modes. In some examples, power management module 30 may cause power switching device 6 to transition between operating modes in response to receiving a signal. For instance, when power switching device 6 is operating in the full-power mode, power management module 30 may cause power switching device 6 to transition into the low-power operating mode in response to receiving the signal indicating that the level of connector 14B is pulled-up (e.g., from inverter 50).

In some examples, driver logic 20 may include event detection module 32, which may detect occurrences of one or more events. As one example, event detection module 32 may determine occurrences of one or more periodic wake-up events. For instance, event detection module 32 may determine that a wake-up event occurs at a particular time interval (e.g., 1 min, 5 min, 30 min, 1 hour, 1 day, etc.). As another example, event detection module 32 may determine occurrences of one or more fault conditions. For instance, event detection module 32 may determine occurrences of one or more of an over-temperature condition, a short circuit condition, and an overload condition. In some examples, event detection module 32 may output a signal in response to determining that one or more events has occurred or is occurring. For instance, event detection module 32 may output a signal that causes switch 34A to close and switch 34B to open, which as discussed above, may pull-up the level of connector 14B.

FIG. 3 is a flowchart illustrating exemplary operations of an example power switching device, in accordance with one or more techniques of this disclosure. For purposes of illustration only, the example operations are described below within the context of power switching device 6 as shown in FIGS. 1 and 2.

In accordance with one or more techniques of this disclosure, power switching device 6 may initially operate in a full-power mode (302). While operating in the full-power mode, a driver, such as driver 22 of power switching device 6, may provide power to an external device, such as load 10. Power management module 30 may determine whether connector 14B has received a signal that indicates a request that power switching device 6 transition into the low-power operating mode (304). For instance, while operating in the full-power mode, switch 34A of driver logic 20 may be open and switch 34B of driver logic 20 may be closed such that the level of connector 14B is pulled down and power management module 30 may determine that connector 14B has received the signal that indicates the request that power switching device 6 transition into the low-power operating mode when the level of connector 14B is pulled up. In some examples, connector 14B may be configured to receive the signal that indicates the request that power switching device 6 transition into the low-power operating mode from a controller, such as controller 4 of FIG. 1.

If connector 14B has not received the signal that indicates the request that power switching device 6 transition into the low-power operating mode ("No" branch of 304), power management module 30 may cause power switching device 6 to continue to operate in the full-power mode (302). If connector 14B has received the signal that indicates the request that power switching device 6 transition into the low-power operating mode ("Yes" branch of 304), event detection module 32 may determine whether one or more events have occurred (306). If one or more events have occurred ("Yes" branch of 306), events detection module 32 may output, via connector 14B, a signal that indicates the occurrence of the one or more events (310). For instance, event detection module 32 may output a signal that causes switch 34A to close, which may cause the level of connector 14B to be pulled-up. If one or more events have not occurred ("No" branch of 306), power management module 30 may cause power switching device 6 to operate in the low-power mode (308). As discussed above, power switching device 6 may consume less power when operating in the low-power mode than when operating in the full-power mode. In any case, while operating in the low-power mode, fault detection module 32 may continuously or periodically determine whether one or more events have occurred (306), and If one or more faults have occurred ("Yes" branch of 306), event detection module 32 may output, via connector 14B, a signal that indicates the occurrence of the one or more events (310). In some examples, connector 14B may be configured to output the signal that indicates the occurrence of the one or more events to a controller, such as controller 4 of FIG. 1.

Figure 4:
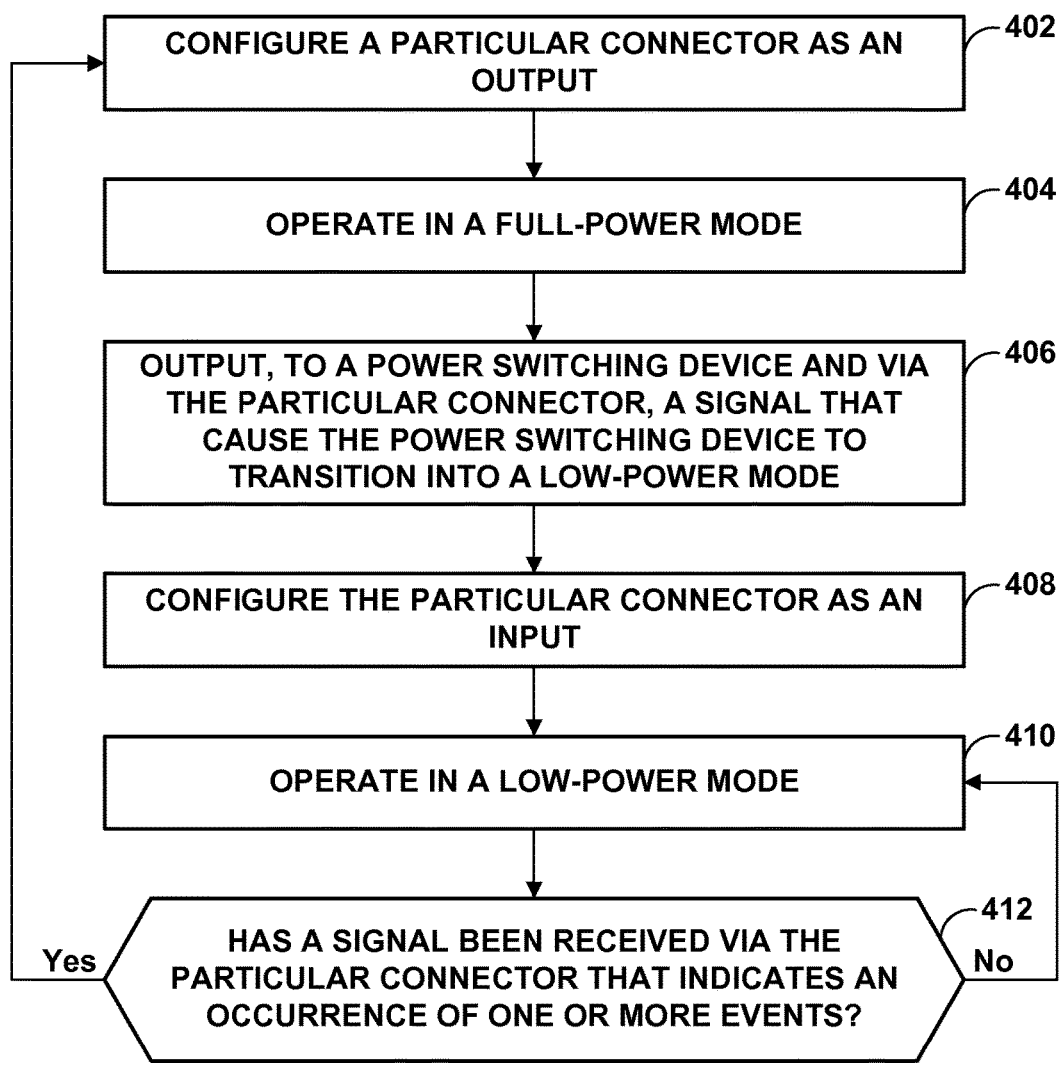
FIG. 4 is a flowchart illustrating exemplary operations of an example controller of a power switching device, in accordance with one or more techniques of this disclosure.

FIG. 4 is a flowchart illustrating exemplary operations of an example controller of a power switching device, in accordance with one or more techniques of this disclosure. For purposes of illustration only, the example operations are described below within the context of controller 4 as shown in FIG. 1.

In accordance with one or more techniques of this disclosure, controller 4 may initially configure a particular connector, such as connector 12B, as an output (402). For instance, where connector 12B is a general purpose input/output (GPIO), controller 4 may programmatically configure connector 12B as an output.

Controller 4 may operate in a full-power mode (404). For instance, where controller 4 is included in a vehicle, controller 4 may be operate in the full-power mode when the vehicle is on (e.g., when the engine is running) Controller 4 may determine to cause a power switching device, such as power switching device 6, to transition into a low-power operating mode. For instance, where controller 4 is included in a vehicle, controller 4 may cause the power switching device to transition from the full-power operating mode to the low-power operating mode in response to receiving a signal indicating that the vehicle has been shut down (e.g., if the vehicle includes an engine, that the engine has been turned off).

Controller 4 may output, to the power switching device and via the particular connector configured as an output, a signal that causes the power switching device to transition from the full-power operating mode to the low-power operating mode (406). For instance, controller 4 may output the signal that causes the power switching device to transition from the full-power operating mode to the low-power operating mode by pulling-up a level of connector 12B.

In some examples, in addition to causing the power switching device to transition into the low-power operating mode, controller 4 may also transition into a low-power operating mode (e.g., a sleep mode). However, it may be desirable for controller 4 to "wake" from the low-power mode under certain circumstances, such as where one or more events are detected by the power switching device. As such, in some examples, when transitioning into the low-power operating mode, controller 4 may configure a connector, such as connector 12B, as an input (408). In some examples, controller 4 may configure the same connector used to output to the signal to the power switching device as an input. For instance, where connector 12B is a GPIO, controller 4 may programmatically reconfigure connector 12B from an output to an input which may operate as an interrupt to cause controller 4 to transition from the low-power operating mode to the full-power operating mode. In some examples, controller 4 may use different connectors to output the signal that causes the power switching device to transition into the low-power operating mode and to receive the signal that indicates whether one or more events have occurred. For instance, controller 4 may use connector 12B to output the signal that causes the power switching device to transition into the low-power operating mode and connector 12C to receive the signal that indicates whether one or more events have occurred.

While operating in the low power-mode (410), controller 4 may determine whether a signal has been received that indicates an occurrence of one or more events (412). In some examples, controller 4 may determine that a signal that indicates an occurrence of one or more events has been received in response to determining that a level of the connector configured as an input is pulled-up. For instance, controller 4 may determine that a signal that indicates an occurrence of one or more events has been received in response to determining that a level of connector 12B is pulled-up for a defined period of time (e.g., 1 ms, 5 ms, 20 ms).

If a signal has not been received that indicates an occurrence of one or more events ("No" branch of 412), controller 4 may continue to operate in the low-power mode (410). If a signal has been received that indicates an occurrence of one or more events ("Yes" branch of 412), controller 4 may reconfigure the connector as an output (402) and transition to operation in the full-power mode (404).

The following numbered examples may illustrate one or more aspects of the disclosure:

Example 1

A method comprising: receiving, by a power switching device and via a connector of the power switching device, a signal that causes the power switching device to transition from a first operating mode to a second operating mode in which the power switching device consumes less current than the first operating mode; and responsive to determining, while the power switching device is in the second operating mode, an occurrence of one or more events, outputting, by the power switching device and via the same connector of the power switching device, a signal that indicates the occurrence of the one or more conditions.

Example 2

The method of example 1, wherein outputting the signal that indicates the occurrence of the one or more events comprises pulling-up a level of the connector of the power switching device for a defined period of time.

Example 3

The method of any combination of examples 1-2, wherein the signal that causes the power switching device to transition from the first operating mode to the second operating mode is received from a controller of the power switching device.

Example 4

The method of any combination of examples 1-3, wherein the signal that indicates the occurrence of one or more events causes the controller of the power switching device to transition from a second operating mode to a first operating mode in which the controller consumes more current than the second operating mode.

Example 5

The method of any combination of examples 1-4, wherein the one or more events include one or more of: one or more periodic wake-up events; and one or more fault conditions.

Example 6

The method of any combination of examples 1-5, wherein the one or more fault conditions include one or more of: an over-temperature condition, a short circuit condition, and an overload condition.

Example 7

A system comprising: a controller; and a power switching device, wherein: the controller is configured to output a signal to a connector of the power switching device that causes the power switching device to transition from a first operating mode to a second operating mode in which the power switching device consumes less power than in the first operating mode, after outputting the signal to the connector of the power switching device that causes the power switching device to transition from the first operating mode to the second operating mode, the controller is configured to transition from a first operating mode to a second operating mode in which the controller consumes less power than in the first operating mode, while in the second operating mode, in response to determining an occurrence of one or more events, the power switching device is configured to output, via the same connector of the power switching device, a signal that indicates the occurrence of the one or more events, and the controller is configured to transition from the second operating mode to the first operating mode in response to receiving, from the power switching device, the signal that indicates the occurrence of the one or more events.

Example 8

The system of example 7, wherein: the controller is configured to output the signal to the connector of the power switching device that causes the power switching device to transition from the first operating mode to the second operating mode via a particular connector of the controller, the controller is configured to receive the signal that indicates the occurrence of the one or more events via the particular connector of the controller, and the controller is configured to transition from the first operating mode to the second operating mode by at least configuring the particular connector as an input.

Example 9

The system of any combination of examples 7-8, wherein: the controller is configured to output the signal to the connector of the power switching device that causes the power switching device to transition from the first operating mode to the second operating mode via a first connector of the controller, and the controller is configured to receive the signal that indicates the occurrence of the one or more events via a second connector of the controller.

Example 10

The system of any combination of examples 7-9, wherein the system is included in a vehicle, and wherein the controller is configured to output the signal to a connector of the power switching device that causes the power switching device to transition from the first operating mode to the second operating mode in response to determining that an engine of the vehicle is shutdown.

Example 11

A power switching device comprising: a connector configured to receive a signal that causes the power switching device to transition from a first operating mode to a second operating mode in which the power switching device consumes less current than the first operating mode; and one or more processors configured to output, via the same connector of the power switching device and in response to determining an occurrence of one or more events while the power switching device is in the second operating mode, a signal that indicates the occurrence of the one or more events.

Example 12

The power switching device of example 11, wherein the one or more processors are configured to output the signal that indicates the occurrence of the one or more events by at least pulling-up a level of the connector of the power switching device for a defined period of time.

Example 13

The power switching device of any combination of examples 11-12, wherein the signal that causes the power switching device to transition from the first operating mode to the second operating mode is received from a controller of the power switching device.

Example 14

The power switching device of any combination of examples 11-13, wherein the signal that indicates the occurrence of one or more events causes the controller of the power switching device to transition from a second operating mode to a first operating mode in which the controller consumes more current than the second operating mode.

Example 15

The power switching device of any combination of examples 11-14, wherein the one or more events include one or more of: one or more periodic wake-up events; and one or more fault conditions.

Example 16

A power switching device comprising: means for receiving a signal that causes the power switching device to transition from a first operating mode to a second operating mode in which the power switching device consumes less current than the first operating mode; and means for determining, an occurrence of one or more events, wherein the means for receiving are further configured to output, while the power switching device is in the second operating mode, a signal that indicates the occurrence of the one or more events.

Example 17

The power switching device of example 16, wherein the means for receiving are configured to output the signal that indicates the occurrence of the one or more events by at least pulling-up a level of the connector of the power switching device for a defined period of time.

Example 18

The power switching device of any combination of examples 16-17, wherein the signal that causes the power switching device to transition from the first operating mode to the second operating mode is received from a controller of the power switching device.

Example 19

The power switching device of any combination of examples 16-18, wherein the signal that indicates the occurrence of one or more events causes the controller of the power switching device to transition from a second operating mode to a first operating mode in which the controller consumes more current than the second operating mode.

Example 20

The power switching device of any combination of examples 16-19, wherein the one or more events include one or more of: one or more periodic wake-up events; and one or more fault conditions.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects have been described in this disclosure. These and other aspects are within the scope of the following claims.

The invention claimed is:

1. A method comprising:
receiving, by a power switching device and via a connector of the power switching device, a signal that causes the power switching device to transition from a first operating mode to a second operating mode in which the power switching device consumes less current than the first operating mode;
determining, while the power switching device is in the second operating mode, an occurrence of one or more events; and
responsive to determining the occurrence of the one or more events, outputting, by the power switching device and via the same connector of the power switching device, a signal that indicates the occurrence of the one or more events.

2. The method of claim 1, wherein outputting the signal that indicates the occurrence of the one or more events comprises pulling-up a level of the connector of the power switching device for a defined period of time.

3. The method of claim 1, wherein the signal that causes the power switching device to transition from the first operating mode to the second operating mode is received from a controller of the power switching device.

4. The method of claim 3, wherein the signal that indicates the occurrence of one or more events causes the controller of the power switching device to transition from a second operating mode to a first operating mode in which the controller consumes more current than the second operating mode.

5. The method of claim 1, wherein the one or more events include one or more of:
one or more periodic wake-up events; and
one or more fault conditions.

6. The method of claim 5, wherein the one or more fault conditions include one or more of: an over-temperature condition, a short circuit condition, and an overload condition.

7. A system comprising:
a controller; and
a power switching device, wherein:
the controller is configured to output a signal to a connector of the power switching device that causes the power switching device to transition from a first operating mode to a second operating mode in which the power switching device consumes less power than in the first operating mode,
after outputting the signal to the connector of the power switching device that causes the power switching device to transition from the first operating mode to the second operating mode, the controller is configured to transition from a first operating mode to a second operating mode in which the controller consumes less power than in the first operating mode,
the power switching device is configured to determine, while in the second operating mode, an occurrence of one or more events,
in response to determining the occurrence of the one or more events, the power switching device is configured to output, via the same connector of the power switching device, a signal that indicates the occurrence of the one or more events, and
the controller is configured to transition from the second operating mode to the first operating mode in response to receiving, from the power switching device, the signal that indicates the occurrence of the one or more events.

8. The system of claim 7, wherein:
the controller is configured to output the signal to the connector of the power switching device that causes the power switching device to transition from the first operating mode to the second operating mode via a particular connector of the controller,
the controller is configured to receive the signal that indicates the occurrence of the one or more events via the particular connector of the controller, and
the controller is configured to transition from the first operating mode to the second operating mode by at least configuring the particular connector as an input.

9. The system of claim 7, wherein:
the controller is configured to output the signal to the connector of the power switching device that causes the power switching device to transition from the first operating mode to the second operating mode via a first connector of the controller, and
the controller is configured to receive the signal that indicates the occurrence of the one or more events via a second connector of the controller.

10. The system of claim 7, wherein the system is included in a vehicle, and wherein the controller is configured to output the signal to a connector of the power switching device that causes the power switching device to transition from the first operating mode to the second operating mode in response to determining that an engine of the vehicle is shutdown.

11. A power switching device comprising:
a connector configured to receive a signal that causes the power switching device to transition from a first operating mode to a second operating mode in which the power switching device consumes less current than the first operating mode; and
one or more processors configured to:
determine, while the power switching device is in the second operating mode, an occurrence of one or more events; and
output, via the same connector of the power switching device and in response to determining the occurrence of the one or more events, a signal that indicates the occurrence of the one or more events.

12. The power switching device of claim 11, wherein the one or more processors are configured to output the signal that indicates the occurrence of the one or more events by at least pulling-up a level of the connector of the power switching device for a defined period of time.

13. The power switching device of claim 11, wherein the signal that causes the power switching device to transition from the first operating mode to the second operating mode is received from a controller of the power switching device.

14. The power switching device of claim 13, wherein the signal that indicates the occurrence of one or more events causes the controller of the power switching device to transition from a second operating mode to a first operating mode in which the controller consumes more current than the second operating mode.

15. The power switching device of claim 11, wherein the one or more events include one or more of:
one or more periodic wake-up events; and
one or more fault conditions.

16. A power switching device comprising:
means for receiving a signal that causes the power switching device to transition from a first operating mode to a second operating mode in which the power switching device consumes less current than the first operating mode; and
means for determining, an occurrence of one or more events,
wherein the means for receiving are further configured to output, while the power switching device is in the second operating mode, a signal that indicates the occurrence of the one or more events.

17. The power switching device of claim 16, wherein the means for receiving are configured to output the signal that indicates the occurrence of the one or more events by at least pulling-up a level of the connector of the power switching device for a defined period of time.

18. The power switching device of claim 16, wherein the signal that causes the power switching device to transition from the first operating mode to the second operating mode is received from a controller of the power switching device.

19. The power switching device of claim 18, wherein the signal that indicates the occurrence of one or more events causes the controller of the power switching device to transition from a second operating mode to a first operating mode in which the controller consumes more current than the second operating mode.

20. The power switching device of claim 16, wherein the one or more events include one or more of:
one or more periodic wake-up events; and
one or more fault conditions.

\* \* \* \* \*